O. R. EMERY.
MUD AND DUST SHIELD FOR AUTOMOBILES.
APPLICATION FILED JAN. 14, 1920.
1,352,798.
Patented Sept. 14, 1920.
2 SHEETS—SHEET 1.
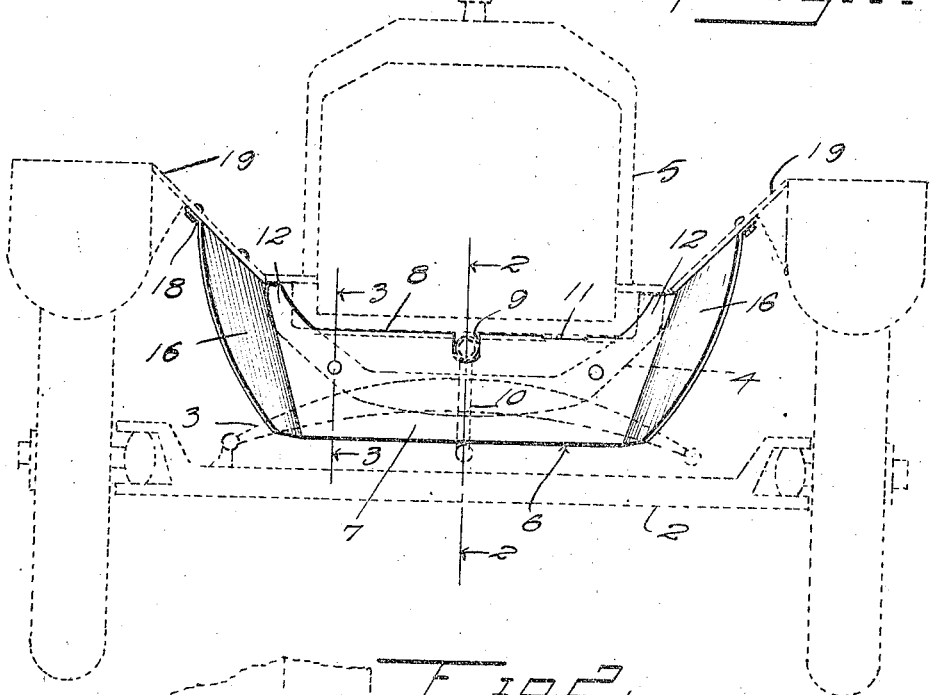
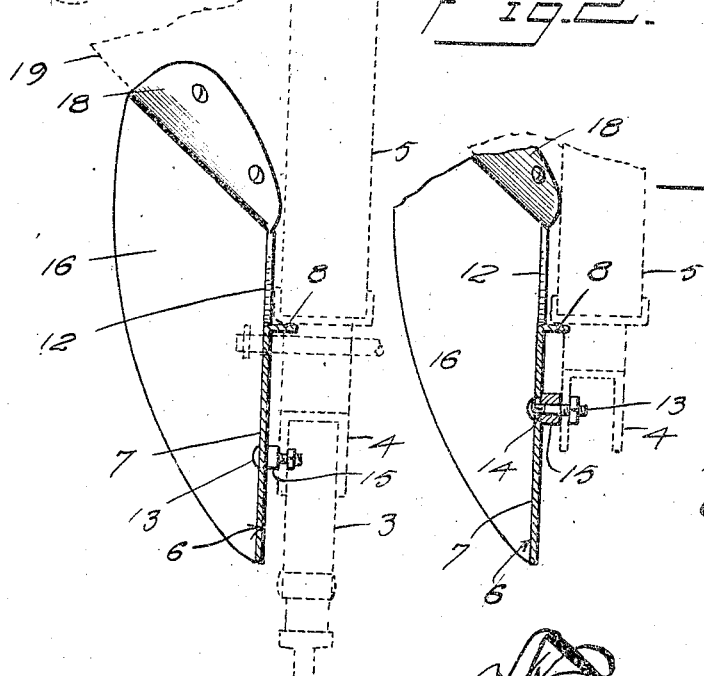
Inventor
O. R. Emery O. R. EMERY.
MUD AND DUST SHIELD FOR AUTOMOBILES.
APPLICATION FILED JAN. 14, 1920.
1,352,798.
Patented Sept. 14, 1920.
2 SHEETS—SHEET 2.
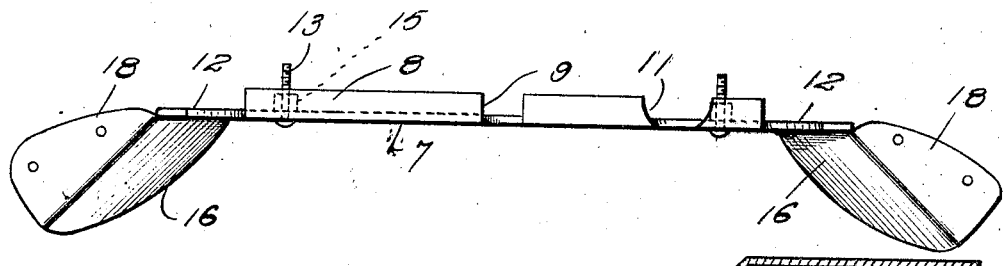
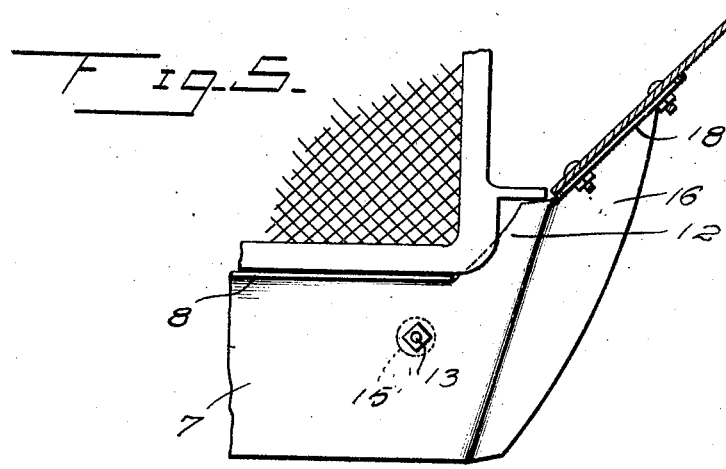
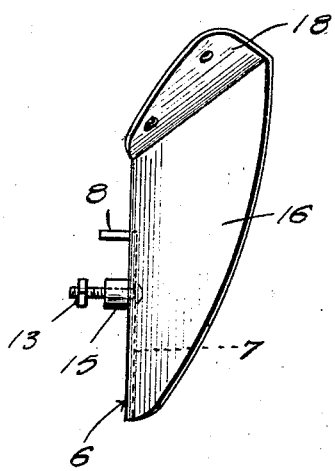
Inventor
O. R. Emery

UNITED STATES PATENT OFFICE.

OSCAR R. EMERY, OF MILWAUKEE, WISCONSIN.

MUD AND DUST SHIELD FOR AUTOMOBILES.

1,352,798.   Specification of Letters Patent.   Patented Sept. 14, 1920.

Application filed January 14, 1920. Serial No. 351,431.

*To all whom it may concern:*

Be it known that I, OSCAR R. EMERY, a citizen of the United States, residing at Milwaukee, in the county of Milwaukee and State of Wisconsin, have invented certain new and useful Improvements in Mud and Dust Shields for Automobiles; and I do hereby declare the following to be a full, clear, and exact description of the invention, such as will enable others skilled in the art to which it appertains to make and use the same.

This invention relates to new and useful improvements in mud and dust shields for automobiles and has for its primary object to provide a device especially constructed to close the front of an automobile known as the Ford, to prevent dust and mud from getting to the engine thereof and also to present a finished and attractive appearance to the automobile.

Another object of this invention is the provision of a mud and dust shield of the above stated character, which shall be simple, durable, and efficient, and which may be readily and conveniently installed upon an automobile without altering the construction thereof, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a front elevation of a mud and dust shield constructed in accordance with my invention and illustrating the same applied to an automobile and said automobile shown in dotted lines in rear of said shield, Fig. 2 is a sectional view taken on the line 2—2 of Fig. 1, Fig. 3 is a similar view taken on the line 3—3 of Fig. 1, Fig. 4 is a plan view of the shield, Fig. 5 is a rear elevation of one end of the shield applied to the automobile, Fig. 6 is an end view of the shield.

Referring in detail to the drawing, the numeral 1 indicates a portion of an automobile in which is shown a front axle 2 carrying a spring 3 that supports the front end of the chassis 4. The chassis 4 supports the radiator 5 and from the drawings it will be noted that the lower edge of the radiator 5 is spaced from the front end of the chassis 4 leaving an opening where dust and mud can pass through and come in contact with the usual engine located in rear of the radiator. To overcome this objection I have provided a shield 6 consisting of a body 7 that closes the space between the chassis and the radiator 5 and depends below the spring 3 and has formed upon its upper edge an inwardly directed flange 8 that underlies the lower end of the radiator 5 and in contact with the same. The body 7 and the flange 8 are cut away to form a slot 9 to permit the usual crank handle 10 of the engine to extend through the shield. The flange 8 is also provided with a cut-out portion to form a notch 11 which is to receive the return pipe of the radiator 5. Extensions 12 are formed on the upper corners of the body 7 and engage the chassis 4 on each side of the radiator and having bolts 13 extending therethrough which bolts are provided with squared portions 14 projecting beyond the rear face of the shield to engage within recesses formed in bushings 15 mounted on said bolts so that a firm connection is established between the bushings and the shield. The bolts 13 are adapted to extend through the chassis 4 and have nuts turned thereon so that the shield is firmly secured in place.

The ends of the body 7 and the extensions 12 have formed integrally therewith outwardly and forwardly projecting flanges 16 that have their outer edges curved so as to form a neat and attractive appearance to the shield.

The flanges 16 have formed thereon rearwardly extending inclined ears 18 which are bolted or otherwise secured to the under faces of the front mud guards 19 of the automobile 1, thus it will be seen that the shield is permanently secured in position and will completely close the space occurring between the chassis in the radiator preventing dust and mud from entering said space and coming in contact with the engine and other working parts of the automobile.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. A shield comprising an elongated body adapted to close the space occurring between the lower edge of the radiator and the front end of the chassis of an automobile, an inwardly directed flange formed on the upper edge of said body and underlying the bottom of the radiator and having a notch therein, said notch extending into the body to receive the crank handle of the automobile, said flange having a second notch to receive the water return pipe of the radiator, and means securing the body to the automobile.

2. A shield comprising an elongated body adapted to close the space between the lower edge of the radiator and the front end of the chassis of an automobile, an inwardly directed flange formed on said body and underlying the radiator, extensions formed on the upper corners of said body and lying in close proximity to the chassis, and means securing the body to an automobile.

3. A shield comprising an elongated body, a flange formed on said body and underlying the radiator, extensions formed on the upper corners of said body and engaging the chassis of the automobile, means securing the body to the chassis, and means securing the body to the front mud guards of the automobile.

4. A shield comprising an elongated body, extensions formed on the upper corners of said body and engaging the chassis of an automobile, forwardly and outwardly directed flanges formed on the ends of said body and having their outer edges curved, upwardly and rearwardly extending ears formed on the upper ends of said flanges and secured to the front mud guards of an automobile, and means securing the body to the chassis of the automobile.

In testimony whereof I affix my signature in presence of two witnesses.

OSCAR R. EMERY.

Witnesses:
GEORGE J. SCHOMER,
J. A. SWENSEN.